United States Patent Office 2,940,973
Patented June 14, 1960

2,940,973

SEPARATION OF ISOPROPANOLAMINE FROM MIXTURES THEREOF WITH 2,5-DIMETHYL-PIPERAZINE BY AZEOTROPIC DISTILLATION

John T. Patton, Jr., Wyandotte, Mich., assignor to Wyandotte Chemicals Corporation, Wyandotte, Mich., a corporation of Michigan No Drawing. Filed Dec. 2, 1953, Ser. No. 395,850

1 Claim. (Cl. 260—268)

This invention relates to a method of separating isopropanolamine from mixtures thereof with 2,5-dimethylpiperazine. More specifically, the invention relates to a method of separating isopropanolamine from mixtures thereof with 2,5-dimethylpiperazine by adding an azeotroping agent selected from the group consisting of toluene and chlorobenzene to the mixture and distilling therefrom an azeotrope consisting predominantly of isopropanolamine and azeotroping agent.

It is disclosed in the copending application of W. K. Langdon, Serial No. 361,881 filed June 15, 1953, now abandoned, that 2,5-dimethylpiperazine can be prepared by passing isopropanolamine over a hydrogenation/dehydrogenation catalyst. The reaction conditions required to obtain high yields in the reaction convert only a portion of the isopropanolamine to 2,5-dimethylpiperazine. Consequently, the reaction product obtained is a mixture of isopropanolamine and 2,5-dimethylpiperazine. Isopropanolamine and 2,5-dimethylpiperazine boil at substantially the same temperature (isopropanolamine 159.5° C., trans-2,5-dimethylpiperazine 160° C.) and cannot be separated by distillation. The separation of this mixture by other conventional unit processes, e.g. solvent extraction, is difficult and not commercially feasible. The difficulty of separating isopropanolamine from mixtures thereof with 2,5-dimethylpiperazine has seriously retarded the development of this synthesis.

A primary object of this invention is to provide an efficient method of separating isopropanolamine from mixtures thereof with 2,5-dimethylpiperazine.

Other objects and advantages of this invention will be apparent from the following detailed description thereof.

It has been discovered that isopropanolamine can be separated from mixtures thereof with 2,5-dimethylpiperazine by adding to the mixture an azeotroping agent selected from the group consisting of toluene and chlorobenzene and heating to distill the isopropanolamine therefrom as an azeotrope with the azeotroping agent. When toluene is employed as the azeotroping agent, the isopropanolamine-toluene azeotrope distills at about 110° C. and contains approximately 5% isopropanolamine. When chlorobenzene is employed as the azeotroping agent, the isopropanolamine-chlorobenzene azetotrope distills at 128–130° C. and contains approximately 13% isopropanolamine.

The isopropanolamine can be separated from the azeotroping agent by conventional methods that will be obvious to those skilled in the art. For example, the isopropanolamine may be recoverd in substantially quantitative yields by extraction with water or dilute mineral acids such as hydrochloric or sulfuric.

In the above examples the isopropanolamine that was recovered contained a small amount of 2,5-dimethylpiperazine. It is possible that the azeotrope involved is a ternary one involving the azeotroping agent, isopropanolamine and 2,5-dimethylpiperazine, although this is considered to be improbable. It is more probable that the 2,5-dimethylpiperazine simply codistills with the isopropanolamine azetotroping agent azeotrope and can be excluded by the use of more efficient distilling columns. In any event, however, this small amount of 2,5-dimethylpiperazine does not interfere with the utility of the process, especially when the isopropanolamine is recycled to make more 2,5-dimethylpiperazine. In the appended claim, where isopropanolamine is used, the term is also intended to cover the material which contains the small quantity of 2,5-dimethylpiperazine normally obtained in the azeotropic distillation.

In the synthesis of 2,5-dimethylpiperazine from isopropanolamine, it is also possible to form the unsaturated 2,5-dimethylpyrazine which, when present, complicates the separation problem. For this reason it is preferred to remove any 2,5-dimethylpyrazine that is present as a water-2,5-dimethylpyrazine azeotrope before the azeotroping agent is added to the isopropanolamine-2,5-dimethylpiperazine mixture.

What is claimed is:

A method of separating isopropanolamine from a mixture thereof with 2,5-dimethylpiperazine, which comprises adding to the mixture chlorobenzene, heating the mixture and distilling therefrom an azeotrope consisting predominantly of isopropanolamine and chlorobenzene.

References Cited in the file of this patent

UNITED STATES PATENTS

| | | |
|---|---|---|
| 2,315,139 | Stengel | Mar. 30, 1943 |
| 2,363,158 | Stasse | Nov. 21, 1944 |
| 2,449,152 | Speck | Sept. 14, 1948 |